United States Patent [19]

Hoftman

[11] Patent Number: 5,681,018
[45] Date of Patent: Oct. 28, 1997

[54] OPERATING ROOM TRAY SYSTEM

[76] Inventor: Moshe M. Hoftman, 9410 DeSoto Ave., Chatsworth, Calif. 91311

[21] Appl. No.: 404,281

[22] Filed: Mar. 14, 1995

Related U.S. Application Data

[63] Continuation-in-part of Ser. No. 204,673, Mar. 2, 1994, abandoned.

[51] Int. Cl.⁶ ................................................. F16M 11/00
[52] U.S. Cl. ........................... 248/125.8; 248/288.51; 5/507.1
[58] Field of Search .................. 248/288.5, 125.8, 248/274.1; 5/507.1

[56] References Cited

U.S. PATENT DOCUMENTS

| 2,377,949 | 6/1945 | McMenamy | 248/125.8 |
| 2,595,647 | 5/1952 | Du Mais | 248/125.8 |
| 2,703,265 | 3/1955 | Wolfe | 5/507.1 X |
| 2,904,798 | 9/1959 | Heflin | 5/507.1 X |
| 3,086,226 | 4/1963 | Kyser | 5/507.1 |
| 3,272,464 | 9/1966 | Jacobson | 248/125.8 |
| 4,725,027 | 2/1988 | Bekanich | 248/125.8 |
| 5,022,617 | 6/1991 | Henderson | 248/125.8 |

Primary Examiner—Alvin C. Chin-Shue

[57] ABSTRACT

The operating room tray system of this invention has a post clamped to a bed rail on the operating table. Above the table level above the sterile field, a tube is slidably mounted on the post and is clampable thereon. A surgical tray is mounted on the tube so that it may be adjusted and clamped above the sterile field.

9 Claims, 2 Drawing Sheets

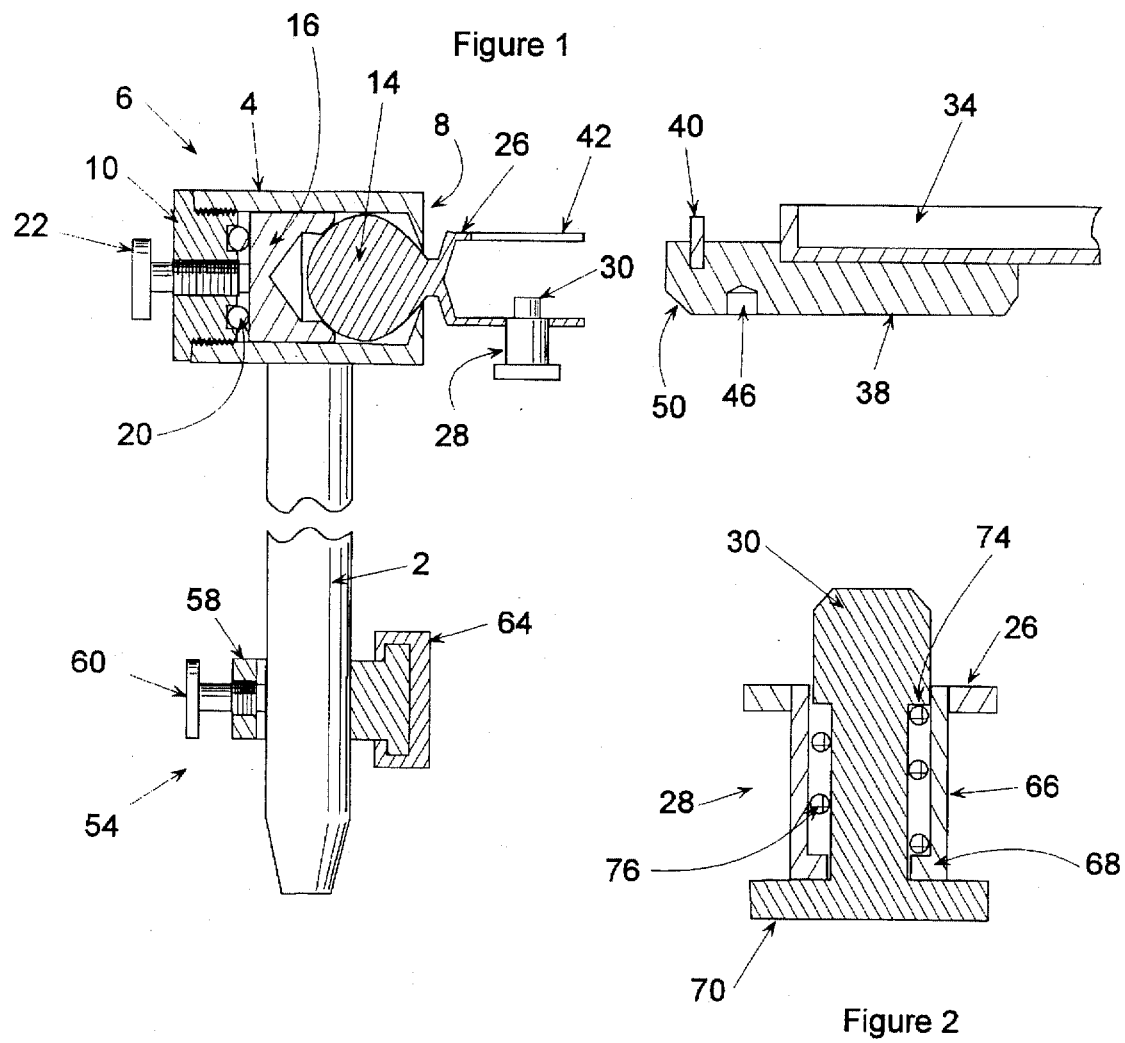
Figure 1
Figure 2
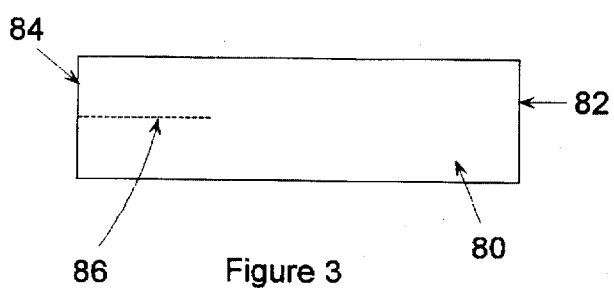
Figure 3

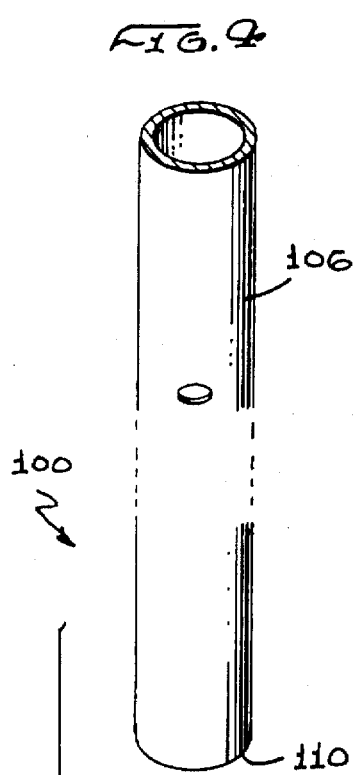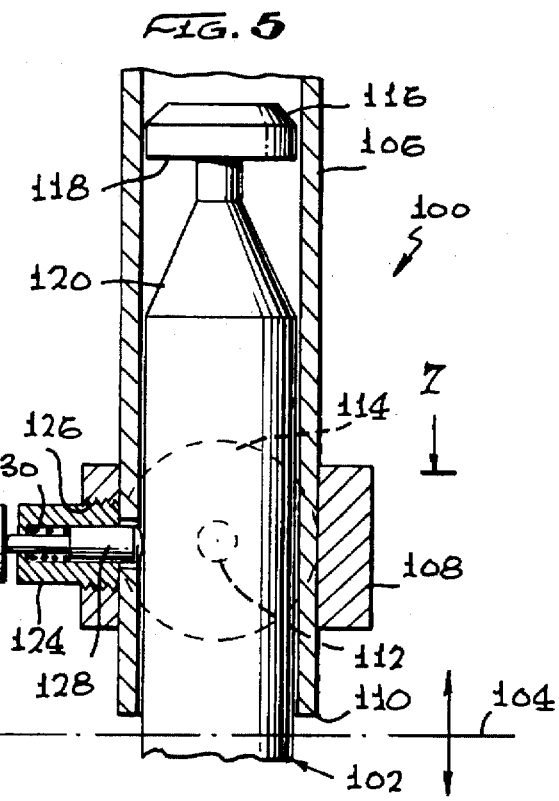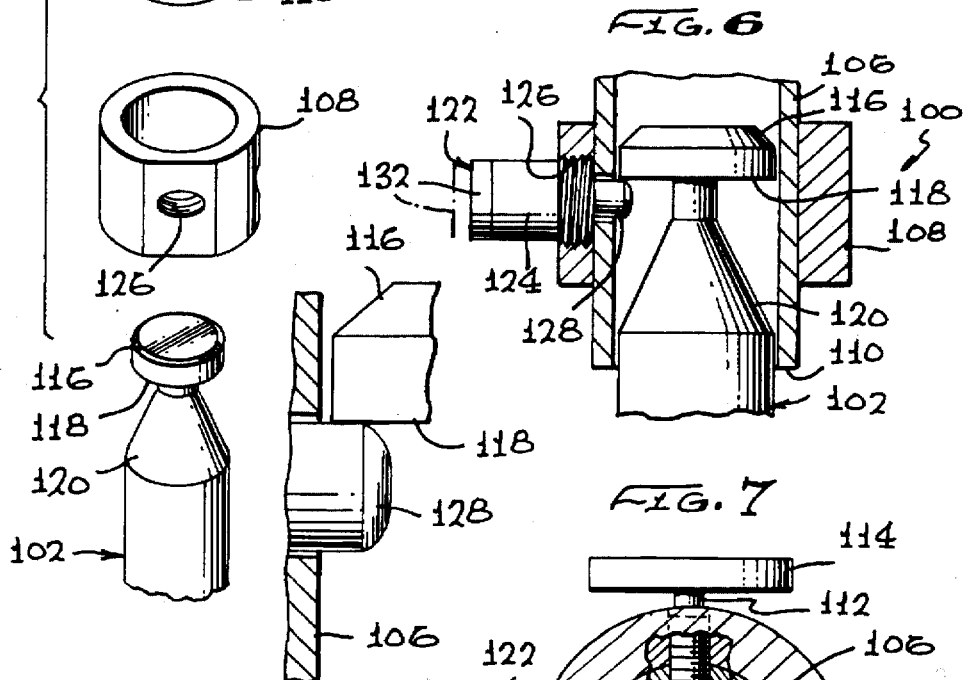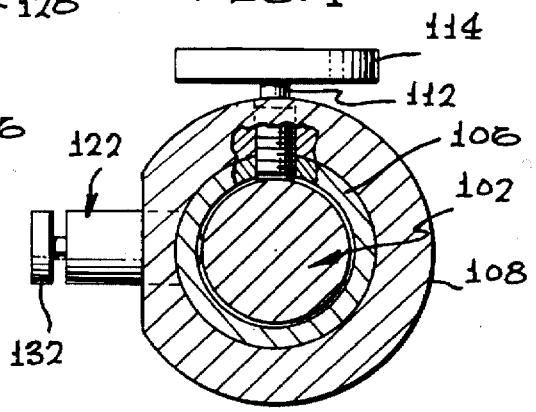

OPERATING ROOM TRAY SYSTEM

CROSS-REFERENCE

This application is a continuation-in-part of patent application, Ser. No. 08/204,673, filed Mar. 2, 1994, abandoned, for "Operating Room Tray System"

FIELD OF THE INVENTION

This present invention relates to operating room tray systems including a tray and elements for supporting the tray in a selected position relative to an operating table.

BACKGROUND OF THE INVENTION

Many surgical procedures require the placement of instruments and surgical and diagnostic equipment in proximity to the patient where they can be easily reached by the surgeon. For example, surgical sharps which include scalpels, other cutting instruments, suturing needles, etc., must be placed in a position where they can be seen by the surgeon who views the operating site. While it has been the conventional practice for an operating room nurse to place each such device directly in the surgeon's hand and for the surgeon to subsequently hand the device directly back to the nurse, this procedure has the significant drawback of increasing the danger that one of the individuals involved will be cut during the transfer. Of course, such cutting with a device which has been contaminated with the patient's blood is undesirable.

There are other surgical procedures which employ devices, such as laparoscopic procedures, in which various instruments must be placed in proximity to the patient. This requirement also exists in the case of cosmetic and plastic surgery, ENT surgery, eye surgery, implantation of pacemakers, laryngoscopy, tonsillectomies, etc. In many procedures of this type, it is presently the practice to place devices on the patient's chest, which does not provide a stable support surface.

It has been proposed to utilize, for procedures of the type described above, a system which supports a tray above the patient for supporting various instruments and apparatus and to use such a tray as an intermediate support for transfer of instruments, such as sharps, between the operating surgeon and the attending nurse. One system of this type is marketed by Skytron of Grand Rapids, Mich. 49508, for example under model designation P/N 6-060-01. This system is constructed to be mounted on a side rail with which operating tables are typically equipped. This system, as well as other tray systems of this type, are of some use. However, they employ positioning mechanisms which have a considerable degree of operating complexity, which is disadvantageous in an operating room situation. The Skytron tray system, for example, has two separate mechanisms for orienting the tray and can be oriented only in certain directions.

In addition, the trays of existing systems are too wide to be acceptable for effective transfer of instruments between a surgeon and a nurse.

SUMMARY OF THE INVENTION

In order to aid in the understanding of this invention, it can be stated in essentially summary form that it is directed to an operating room tray system which has a post which is clampable to the operating room table, or the like, and which extends upward from the non-sterile into the sterile field. A second member is vertically adjustable on the post and is clampable with respect thereto. The second member carries the tray so that tray height adjustment can be made in the sterile field.

It is thus a purpose and advantage of this invention to provide a novel operating room tray system which minimizes the difficulties presented by known systems of this type.

A more specific object of the invention is to provide an operating room tray system which allows a tray to be oriented to any position by simple manipulations.

Another object of the invention is to provide an operating room tray system in which a tray will be held in a selected position until it is manually repositioned.

A further object of the invention is to provide an operating room tray system which can be easily covered with a surgical drape to maintain sterile operating conditions.

Another object of the invention is to provide an operating room tray system having a tray which can provide a convenient and effective instrument delivery surface for transfer of sharps and other instruments between a surgeon and a nurse in a neutral zone, which is a zone between the surgeon and the nurse and within the field of peripheral vision of the surgeon.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is an elevation view, with parts broken away and parts taken in cross section, illustrating the components of a preferred embodiment of an operating room tray system according to the invention of the parent application.

FIG. 2 is an elevational, cross-sectional detail view, to a larger scale than FIG. 1, showing one of the components of the system illustrated in FIG. 1.

FIG. 3 is an elevational view, to a smaller scale than FIG. 1, of a novel surgical drape that can be used as part of the system of FIG. 1.

FIG. 4 is an exploded perspective view of the telescoping portion of the preferred embodiment of the operating room tray system according to the present invention, with top and bottom parts broken away.

FIG. 5 is an enlarged elevational view, with parts broken away and parts taken in section, of the engagement between the post and tube of the system of FIG. 4.

FIG. 6 is a view similar to FIG. 5, in a different relative position of the post and tube.

FIG. 7 is a section taken generally along line 7—7 of FIG. 5.

FIG. 8 is an enlarged view of a portion of FIG. 6, showing engagement of a safety stop between the post and tube.

DESCRIPTION OF THE PREFERRED EMBODIMENTS

Referring first to FIG. 1, the illustrated preferred embodiment of an operating room tray system according to the invention of the parent application, which is illustrated only by way of example, includes a support post member 2, which may be a tube or solid member of circular cross section. Secured to the upper end of support member 2, as by brazing or welding, is a housing 4 of a tray support device 6. One end of housing 4 is closed by an inwardly directed flange 8 which is integral with housing 4, while the other end of housing 4 is closed by an end cap 10 which may be secured to housing 4 as by being screwed therein.

Within housing 4 there is provided a solid metal ball 14 and a ball clamping pressure element 16, which is dimensioned to be movable within housing 4 in the direction between end cap 10 and ball 14.

Between pressure element 16 and end cap 10, there is provided a resilient O-ring 20 made of any suitable elastomeric material. O-ring 20 may be held in place in a groove formed in the associated surface of end cap 10. End cap 10 is provided with a threaded through bore in which is threadedly engaged a rotatable locking element 22, one end of which extends out of housing 4 and is provided with a handle or knob, and the other end of which projects into housing 4 and is directed toward pressure element 16.

The components within housing 4 are dimensioned, and the characteristics of O-ring 20 are selected so that, when locking element 22 is retracted or moved away from contact with pressure element 16 toward an unlocking state, O-ring 20 continues to urge pressure element 16 against ball 14 with a sufficient force to prevent or oppose any free pivoting movement of ball 14. However, when element 22 is thus retracted, ball 14 can be manually moved, for example by manual pressure on an arm receiving member 26 which is fixed to and preferably integral with ball 14.

Arm receiving member 26 is a tubular member which is provided with a blind bore that opens at the end of member 26 remote from ball 14. Arm receiving member 26 is provided with a locking pin assembly 28 containing a locking pin 30 whose operation and purpose will be described below.

The operating room tray system further includes a tray 34, only one end portion of which is illustrated in FIG. 1, and an arm member 38 fixed to tray 34, as by welding or brazing. Tray 34 may have a rectangular form.

The system according to the invention can perform this function in a particular effective manner and in a manner which is far more satisfactory than with known tray systems, if tray 34 has a suitable width; i.e., the dimension perpendicular to the plane of FIG. 1. Specifically, it has been found that, if tray 34 has a width between 6 inches and 10 inches, it can be used in a particularly convenient manner as such an instrument delivery system without interfering with normal movements by the operating surgeon and nurse and while being positioned at a convenient distance from the surgeon.

Tray 34 may have any suitable length dimension, for example 22 inches.

Arm member 38 is provided with an orientation pin 40 dimensioned to slidably engage in a slot 42 formed in arm receiving member 26. Slot 42 opens at the end of arm receiving member 26, which is remote from ball 14.

Arm member 38 is further provided with a blind bore 46 dimensioned to mate with the free end of pin 30. The bore in arm receiving member 26 and the cross section of arm receiving member 38, both of which may be circular, are dimensioned to permit the end of arm member 38, which carries pin 40 and bore 46 to be inserted into the bore in arm receiving member 26, with pin 40 engaging in slot 42 in order to correctly orient arm member 38, and with pin 30 engaging in bore 46 in order to retain arm member 38 in arm receiving member 26.

The end of arm member 38 which will be inserted into the bore in arm receiving member 26 is provided with a chamfered edge 50 which, during insertion of arm member 38 into the bore in arm receiving member 26, contacts the free end of pin 30 and acts as a camming surface to depress pin 30 and allow the lower surface of arm member 38 to ride over the free end of pin 30 until a position is reached at which pin 30 is aligned with bore 46, at which time pin 30 will be advanced into bore 46. Thus, arm member 38 can be inserted into arm receiving member 26 simply by a plug-in action, whereas in order to remove arm member 38 from arm receiving member 26, it is necessary to manually retract pin 30. Thus, accidental removal of arm member 38, and thus tray 34, from arm receiving member 26 is substantially completely prevented.

The system, as shown in FIG. 1, is completed by an attachment unit 54 composed essentially of a collar 58 having a through hole through which support member 2 extends. Collar 58 carries a clamping screw 60 which threadedly engages in a bore provided in collar 58. By rotating screw 60, support member 2 may be clamped in place in collar 58. Collar 58 further has a slider portion which can engage in a side rail 64 of the type typically provided along the sides of an operating table. If desired, a further clamp or other locking device may be provided to lock collar 58 in position on rail 64.

With the arrangement shown in FIG. 1, tray support device 6 may be placed at any desired height above collar 58 by loosening screw 60, manually moving support member 2 to the desired position, and then tightening screw 60. At the same time, support member 2 and device 6 can be rotated to any desired orientation about the vertical axis of support member 2.

Then, by retracting locking element 22 to an unlocking state, arm receiving member 26, along with arm member 38 and tray 34, can be pivoted about any one or more of three manually orthogonal axes passing through the center of ball 14. Thus, by simple operation of two positioning elements, tray 34 can be brought to any height and any orientation above the operating table.

FIG. 2 illustrates an exemplary embodiment of locking pin assembly 28. This assembly includes a housing 66 which is fixed to arm receiving member 26 and which has an inwardly directed flange 68. Pin 30 includes a release element 70 which may be manually gripped in order to withdraw pin 30 from bore 46. Pin 30 further includes an internal shoulder 74. A compression spring 76 is installed within housing 66 and extends between flange 68 and shoulder 74 in order to bias pin 30 into its extended position, in which it can engage in bore 46.

As illustrated in FIG. 3, the system according to the invention may be further provided with a flexible bag 80 of impermeable material, such as any suitable plastic employed in operating rooms. Bag 80 is closed at one end 82 and open at its other end 84. In addition, bag 80 is provided with a weakened position; e.g., a line of perforations 86 that extends along a line, for example a straight line, and along which bag 80 may be easily torn. Preferably, in embodiments of the invention, bag 80 is provided with two such weakened portions located opposite one another on opposite sides of the bag.

In use, bag 80 is inserted over tray 34, arm member 38, arm receiving member 26, tray support device 6, tubular member 2 and attachment unit 54. In order to pass around the side of collar 58, which is directed toward side rail 64, bag 80 will be torn along one weakened portion 86. Thus, bag 80 may completely cover the other components of the operating room tray system and extend down to near the floor, thereby isolating any contamination which may be present on the metal parts of the operating room tray system from the sterile field.

For certain uses of the operating room tray system, it may be desired to rotate the system so that tray 34 projects away from the operating table. By providing bag 80 with two weakened portions at diametrically opposite sides of the bag, it remains possible to place the bag over all of the metal components of the system and to still fit the bag around attachment unit 54.

The preferred embodiment of the tray adjustment system according to the present invention is generally indicated at 100 in FIGS. 4, 5 and 6. Post 102 has its lower end, broken away in FIGS. 4, 5 and 6, clamped to the bed rail 64 by means of a clamp 54, or the like. The lower end of the post 102, see FIG. 5, is below the level of the sterile drape 104. In operating procedures, the patient and the table on which he rests are considered non-sterile. A sterile drape is placed over him and, above the sterile drape, only persons and equipment which have been subjected to maximum possible sterilization procedures are permitted to be used or permitted to practice. Tube 106 is telescopically slidable down onto the exterior of post 102. Tube 106 carries housing 4 welded on its top. All that is connected to the housing 4, except posts 2, is thus carried at the top of tube 106. The housing 4 carries the tray socket 26 on a tightenable ball joint, and the tray 34 is mounted on arm member 38, which engages on the socket 26.

The up-and-down sliding of the tube 106 on post 102 thus adjusts the height of the tray. In order to lock the tray at a selected height, collar 108 is welded to the exterior of tube 106 adjacent its lower end 110. The collar and tube have a threaded hole therein into which clamp screw 112 is threaded. Clamp screw 112 carries clamp knob 114 secured thereto, as best seen in FIG. 7. The clamp knob is sized for convenient grasp so that it may be loosened and tightened for adjustment of tray height and locking in the selected position.

It could be disastrous in the operating room for the tray to come loose by having the tube 106 slide up off of the top of post 102. Such inadvertent removal might tilt the tray and have the instruments fall off. The instruments would fall into the operating field or be unavailable when needed by the surgeon. In order to prevent this unexpected occurrence, a releasable upper stop is provided. As seen in FIGS. 4, 5 and 6, post 102 has a chamfer 116 at its top. Just below the chamfer, there is an undercut which provides a planar surface 118 which is substantially radial to the axis of the cylindrical post. The planar surface 118 acts as a stop surface. Below the planar surface is another chamfered surface 120.

Collar 108 also carries latch 122. Latch 122 includes a sleeve 124 which threads into hole 126 in collar 108. The sleeve 124 has a bore therein in which slides stop plunger 128. As seen in FIG. 5, a compression spring 130 thrusts the stop plunger to the right. As seen in FIGS. 5 and 6, the stop plunger is in line with an opening in the top 106. Thus, if it is unrestrained, the stop plunger enters the tube, as shown in FIGS. 6 and 8. Cap 132 is secured to the external end of stop plunger 128 and limits right-hand motion of the stop plunger to the distance shown in FIGS. 6 and 8. With this structure, it seen be seen that, when the nurse loosens the clamp screw and raises tube 106 to elevate the tray 34, the stop plunger 128 follows the exterior surface of the post 102. When the tube 106 is raised sufficiently, the stop plunger 128 enters above chamfer 120 and engages against stop surface 118. The tray cannot be raised further.

In order to permit the nurse to completely remove the tray to replace it with another one, the cap 132 can be pulled to pull the stop plunger out from under stop surface 118. Now, the tube 106 and the tray it carries can be removed. It is thus seen that it cannot be inadvertently removed, but pulling of the stop plunger is required. When another identical tray is brought back, its tube 106 is engaged over post 102. The chamfer 116 and the chamfer 120 are at such an angle that, when the lower end 110 of the tube 106 is placed down over the top of the post, these angles successively thrust back the stop plunger so that the new tray may be installed without withdrawal of the stop plunger.

The height of the system is configured so that the top of post 102 extends above the level of the sterile drape 104, and at the normal position of the tray 34, the lower end 110 of the tube is above the level of the sterile drape. The gross adjustments of the rod 102 are made in bed rail clamp 54 before the operation and before the creation of a sterile field. The tube 106 and the tray 34 carried thereby may be put in place after the creation of the sterile field. This means that the clamp 114 is available to the sterile nurse so that adjustment can be made to the tray without requiring the attention of a circulating nurse.

The system according to the invention may also be utilized as a laparoscopic instrument tray. In this case, tray 34 may be positioned above and across the patient's upper chest and neck area and will be used to receive laparoscopic instruments to be utilized during the procedure. When tray 34 is used in this manner, the necessary instruments are prevented from piling up and sliding off of the sterile field.

Tray 34 can also be mounted over the patient's head during open heart surgery to accommodate tools such as a sternal saw, bypass tuning and frequently used instruments and will protect the patient against injury from such instruments.

Additionally, the system may be utilized to aid plastic surgery, throat surgery and eye surgery. In these cases, tray 34 can be mounted over the patient's chest and under the patient's drape and used in the same manner as a known mayo tray for cases in which the surgeon is positioned at the patient's head during the surgical procedure. Tray 34 can be easily adjusted to tilt toward the surgeon permitting better viewing of the instruments on the tray.

During implantation of a pacemaker, tray 34 can be positioned over the patient's head and inclined at an angle to allow the surgeon to view the patient and also to keep the sterile drape provided by bag 80 out of the patient's face.

During direct laryngoscopy and tonsillectomy, tray 34 can be used to brace a laryngoscope holder used in laryngoscopy or a mouth gag used in tonsillectomy.

Thus, a system according to the invention can find a wide variety of uses in the operating room and offers the advantages of being easily and quickly adjustable to remain level, regardless of patient position, and having a narrow tray size so as to facilitate its use in a number of procedures, and for example as an instrument delivery system. In addition, the previously set position of tray 34 will be retained even if locking element 22 should be accidentally loosened.

All components of the system, or at least all components having exposed surfaces, maybe made of stainless steel, and the entire system can rapidly be made sterile by installation of bag 80.

This invention has been described in its presently contemplated best modes, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An operating room tray system comprising:

an operating room table with an upper surface adapted for support of a patient and a frame located generally below the upper surface;

first and second members configured to interengage and longitudinally slide with respect to each other;

first releasable locking means for releasably locking said first member to the operating room table frame;

a surgical tray for carrying operating room supplies;

horizontal attachment means;

second releasable locking means for releasably locking said first and second members with respect to each other so that said surgical tray can be locked at a selected position above the second releasable locking means on said first member; and a ball and socket joint supportively interposed between the horizontal attachment means and the second member and adapted to permit three dimensional inclination and declination of the surgical tray from a horizontal position, wherein one portion of the horizontal attachment means is permanently fixed to the ball of the ball and socket joint, another portion is permanently fixed to the surgical tray, and an intervening portion comprises a releasable plug to generally horizontally, supportively and releasably connect the surgical tray to the ball and socket joint.

2. The operating room tray system of claim 1 wherein one of said members is tubular and the other has a cross section configured to slide longitudinally in said tube.

3. The operating room tray system of claim 2 wherein said tubular member has a right circular cylindrical tubular interior surface.

4. The operating room tray system of claim 2 wherein said means for releasably locking said first and second members comprises a threaded clamp screw engaged in said tube so that it can be tightened to engage upon said member sliding within said tube to lock said member in axial position within said tube.

5. The operating room tray system of claim 4 further including releasable means for inhibiting removal of said second member from said first member.

6. The operating room tray system of claim 5 wherein said second member is tubular and said first member slides therein, releasable means comprising said first member having a stop face thereon and said second member having a releasable stop plunger thereon so that said stop plunger engages against said stop surface on said first member to inhibit removal of said second member from said first member.

7. The operating room tray system of claim 6 wherein said stop plunger is removable from stop position so that said second member can be removed from said first member.

8. The operating room tray system of claim 7 wherein said stop plunger is urged in a direction to engage said stop face.

9. The operating room tray system of claim 7 wherein said tubular member has a right circular cylindrical tubular interior surface.

* * * * *